Dec. 25, 1923.
E. J. CANTWELL
1,478,817
HAY RAKE
Filed Feb. 14, 1921
2 Sheets-Sheet 1
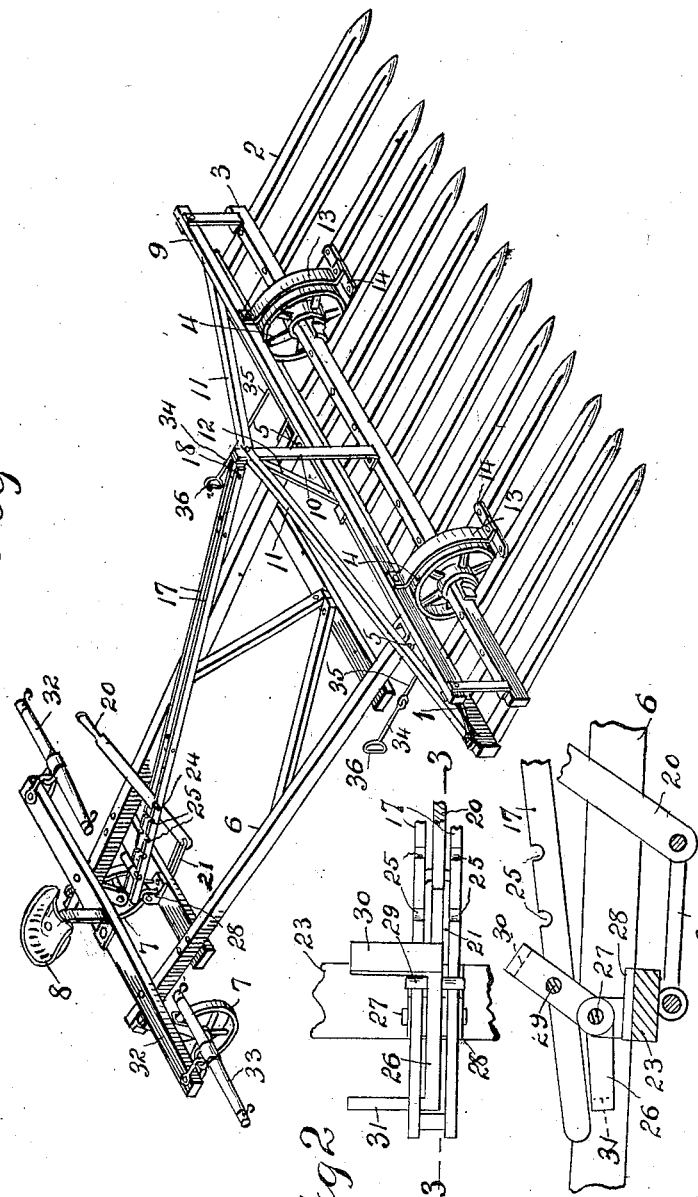
Witness:
R. E. Hamilton
Inventor,
Edward J. Cantwell
By Warren D. House
His Attorney.

Dec. 25, 1923.
E. J. CANTWELL
1,478,817
HAY RAKE
Filed Feb. 14, 1921       2 Sheets-Sheet 2
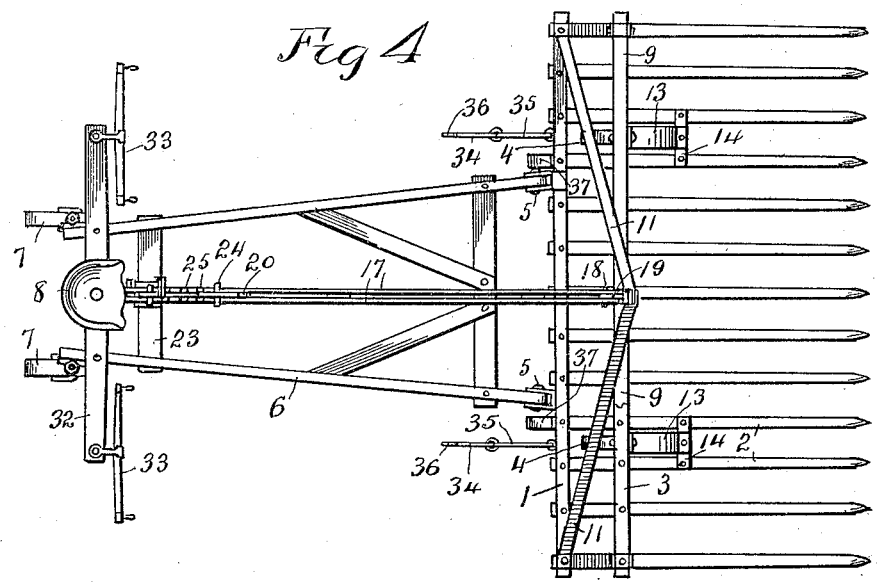
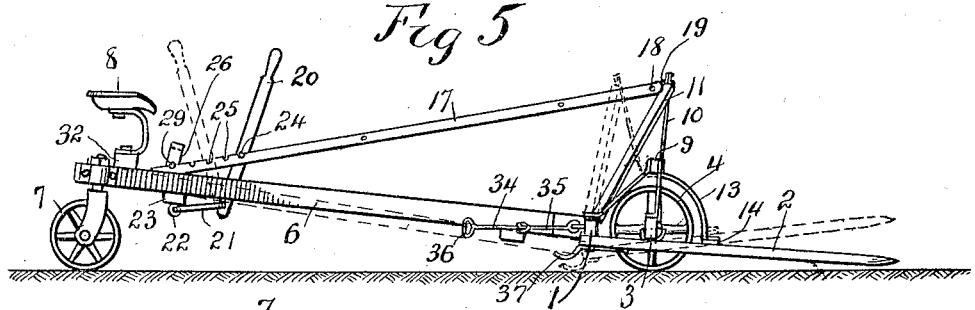
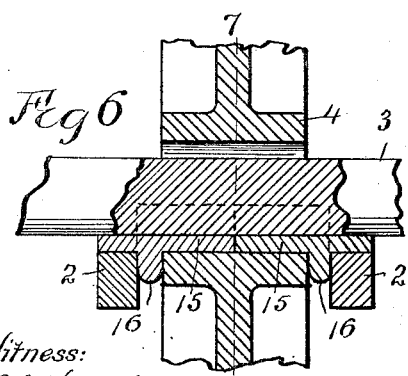
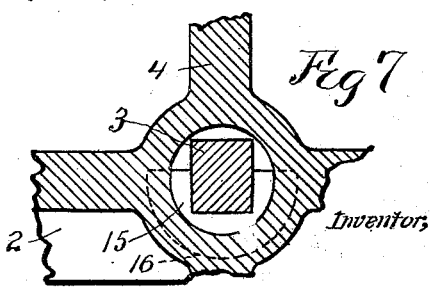

Patented Dec. 25, 1923.

1,478,817

UNITED STATES PATENT OFFICE.

EDWARD J. CANTWELL, OF KANSAS CITY, MISSOURI.

HAYRAKE.

Application filed February 14, 1921. Serial No. 444,671.

*To all whom it may concern:*

Be it known that I, EDWARD J. CANTWELL, a citizen of the United States, residing at Kansas City, in the county of Jackson and State of Missouri, have invented a certain new and useful Improvement in Hayrakes, of which the following is a specification.

My invention relates to improvements in hay rakes.

It relates particularly to the animal drawn type of hay rake.

The object of my invention is to provide a hay rake of the kind described, which is simple in construction, cheap to make, durable and not liable to get out of order, which is easily operated by one man, which may be readily adjusted to different positions and quickly released from any set position, and which is efficient in operation.

The novel features of my invention are hereinafter fully described and claimed.

In the accompanying drawings which illustrate the preferred embodiment of my invention, Fig. 1 is a perspective view of my improved hay rake.

Fig. 2 is an enlarged top view of the lever locking mechanism and parts connected therewith.

Fig. 3 is a vertical sectional view on the line 3—3 of Fig. 2.

Fig. 4 is a plan view of my improved rake.

Fig. 5 is a side elevation of the same.

Fig. 6 is an enlarged vertical sectional view of one of the bearings for the front carrying wheels and parts connected therewith.

Fig. 7 is a vertical sectional view on the line 7—7 of Fig. 6.

Similar characters designate similar parts in the different views.

1 designates a rear transverse bar of a rake frame of any suitable form and provided with the usual teeth or tines 2, removably attached at their rear ends by bolts to the bar 1 and to which are rigidly secured a transverse axle bar 3, on which are rotatably mounted two carrying wheels 4.

The bar 1 is pivoted at its rear side by transverse bolts 5, to a supporting frame 6, mounted on two rear carrying wheels 7, and supporting a seat 8.

Above the axle bar 3 and parallel therewith is a bar 9, to which is fastened a vertical bar 10, which is secured at its lower end to the bar 3, and to which are secured two obliquely disposed brace bars, 11, the outer lower ends of which are attached to the frame 1. An inclined brace bar 12 is attached at its upper end to the bar 10, and extends rearwardly downwardly to the frame 1, to which it is attached.

To keep the hay or straw from having contact with the wheels 4, I provide two arcuate guard plates 13, which are attached at their upper end to the bar 9, and which are attached at their lower ends respectively to two plates 14, removably secured as by bolts to the teeth 2, in front of the wheels 4.

Each of the wheels 4 is mounted on a box consisting of two channel members 15, in the upper side of which is fitted the axle bar 3, and on which is revolubly mounted the adjacent wheel 4, see Figs. 6 and 7. The box members 15 are supported upon two adjacent teeth 2, either of which is removable. Each box member 15 is provided with an arcuate flange 16, disposed between the wheel 4 and the adjacent tooth 2. The flanges 16 hold the box members 15 from longitudinal movement on the axle bar 3. By removing one of the adjacent teeth 2, both box members may be removed or inserted.

For swinging the loaded rake frame from the position shown in solid lines in Fig. 5, to the position shown in dotted lines in said figure, there are provided one or more operating bars 17, the forward ends of which are pivoted to a plate 19, attached to the bar 10, by a transverse bolt 18.

For moving the bars 17 longitudinally in both directions, I provide a lever 20 the lower end of which is pivoted to a link 21, which in turn is pivoted to an eye 22 mounted in a transverse bar 23 secured to the frame 6. The lever 20 has extending through it a horizontal pin 24 which is adapted to enter notches 25 provided in the upper edges of the bars 17. The notches 25 are so shaped that, when the lever 20 is oscillated, the pin 24 will force the bars 17 forwardly and rearwardly.

For releasably locking the bars 17 in the position to which they may be adjusted, I provide a foot operated latch 26, which is pivoted by a transverse pin 27 to a casting 28 secured to the upper side of the bar 23. The latch 26 has mounted in it a transverse pin 29 which is adapted to enter the notches 25 so as to hold the bars 17 in the position to which they may be adjusted.

The upper end of the latch 26 is provided with a lateral extension 30 adapted to be pressed forwardly by the foot of the operator so as to cause the pin 29 to enter the adjacent notches 25 in the bars 17.

The rear lower end of the latch 26 is provided with a laterally extending arm 31 adapted to be forced downwardly by the foot of the operator so as to swing the latch 26 to lift the pin 29 out of the notches 25 in which the pin may be disposed.

The seat 8 is mounted on a transverse bar 32 supported on the frame 6 and having attached to it adjacent to its opposite ends respectively two single-trees 33 to which two horses may be respectively hitched.

For attachment to the harness of the horses, there are provided two bars 34 respectively pivoted at their forward ends to two rods 35 which have their forward ends pivoted to the rake frame bar 1. Each bar 34 at its rear end is provided with a loop 36 adapted to have extended therethrough the breast strap of the adjacent harness.

Secured to the under side and rear end of the rake frame 1 are two curved shoes 37 which are adapted to strike the ground to limit the upward tilting of the forward end of the rake frame, see Figs. 4 and 5.

In the operation of my invention, the horses moving forwardly propel the hay rake in a forward direction. When it is desired to take on a load, the operator swings the lever 20 so as to force the bars 17 forwardly, thus forcing the forward ends of the teeth 2 against the ground. After the load has been taken on, the lever 20 is swung rearwardly to the position shown in dotted lines in Fig. 5, thereby swinging the rake frame by means of the bars 17 to the position shown in dotted lines in Fig. 5. The operator with his foot on the lateral extension 30 swings the latch 26 to a position in which the pin 29 will enter the adjacent notches 25 and thereby hold the bars 17 and the rake frame in the position to which they have been moved.

When the operator depresses the arm 31 of the latch, the latter will be swung so as to release the pin 29 from the bars 17, upon which the rake frame, owing to the weight of the load, will swing to the position shown in solid lines in Fig. 5. By then backing the horses, the rake will be withdrawn from the load which will be deposited on the ground, or on a hay stacker, not shown.

I do not limit my invention to the structure shown and described, as many modifications, within the scope of the appended claims, may be made without departing from the spirit of my invention.

What I claim is:—

1. In a hay rake, a tilting rake frame, carrying wheels supporting said frame on which the frame is adapted to swing, a wheeled seat supporting frame pivoted to the rake frame, means for swinging the rake frame operative from the seat frame, the arrangement being such that, when unloaded, the rake frame will normally swing to a position such that the teeth of the rake frame will incline forwardly and upwardly, and means for limiting such last named movement, substantially as set forth.

2. In a hay rake, an axle, two teeth attached to said axle one tooth being arranged for detachment, a carrying wheel mounted on the axle between said teeth, and a box comprising two members fitted to the underside of the axle and supported by said teeth, each box member having a flange adapted to bear respectively against the adjacent tooth and the adjacent end of the hub of the wheel, the hub being revolubly mounted on said box members between said flanges, substantially as set forth.

3. In a hay rake, a tilting rake frame, carrying wheels on which said frame is adapted to swing vertically, a wheeled seat supporting frame pivoted at its forward end to the rear side of the rake frame, a notched operating bar pivoted at its forward end to the rake frame and longitudinally slidable on the supporting frame, a vertically swinging link pivoted to the supporting frame, and an operating lever pivoted to said swinging link and having means for engaging the notches of the operating bar for forcing the latter longitudinally in opposite directions, substantially as set forth.

In testimony whereof I have signed my name to this specification.

EDWARD J. CANTWELL.